(12) United States Patent
Rosenberg

(10) Patent No.: US 7,438,414 B2
(45) Date of Patent: Oct. 21, 2008

(54) GAZE DISCRIMINATING ELECTRONIC CONTROL APPARATUS, SYSTEM, METHOD AND COMPUTER PROGRAM PRODUCT

(75) Inventor: Louis Barry Rosenberg, Pismo Beach, CA (US)

(73) Assignee: Outland Research, LLC, Pismo Beach, CA (US)

( * ) Notice: Subject to any disclaimer, the term of this patent is extended or adjusted under 35 U.S.C. 154(b) by 336 days.

(21) Appl. No.: 11/381,504

(22) Filed: May 3, 2006

(65) Prior Publication Data
US 2007/0024579 A1    Feb. 1, 2007

Related U.S. Application Data

(60) Provisional application No. 60/703,659, filed on Jul. 28, 2005.

(51) Int. Cl.
*A61B 3/14* (2006.01)

(52) U.S. Cl. .................. 351/210; 351/209; 351/221

(58) Field of Classification Search ............... 351/209, 351/210, 221, 246, 205, 200
See application file for complete search history.

(56) References Cited

U.S. PATENT DOCUMENTS

| | | | |
|---|---|---|---|
| 4,075,657 A | 2/1978 | Weinblatt | |
| 4,827,520 A | 5/1989 | Zinstra | |
| 5,005,203 A | 4/1991 | Ney | |
| 5,036,539 A | 7/1991 | Wrench, Jr. et al. | |
| 5,345,281 A * | 9/1994 | Taboada et al. | 351/210 |
| 5,751,260 A | 5/1998 | Nappi et al. | |
| 5,835,616 A | 11/1998 | Lobo et al. | |
| 5,861,940 A | 1/1999 | Robinson et al. | |
| 6,108,437 A | 8/2000 | Lin | |
| 6,243,076 B1 | 6/2001 | Hatfield | |
| 6,442,573 B1 | 8/2002 | Schiller et al. | |
| 6,493,734 B1 | 12/2002 | Sachs et al. | |
| 6,513,006 B2 | 1/2003 | Howard et al. | |

(Continued)

OTHER PUBLICATIONS

Rosenberg, Louis B., U.S. Appl. No. 11/271,172, filed Nov. 10, 2005.

(Continued)

*Primary Examiner*—Hung X Dang
(74) *Attorney, Agent, or Firm*—Thomas F. Lebens; Sinsheimer Juhnke Lebens & McIvor, LLP

(57) ABSTRACT

An electronic control apparatus, system, method and computer program product for selecting and controlling an electronic device from among a plurality of available electronic devices based upon the substantially contemporaneous issuance of a verbal command and device-targeting gaze by a user. The system includes a processor driven controller unit programmed to control a selected device in dependence on generally contemporaneous aural and optical signals. A gaze sensing unit is operatively coupled to the controller unit and is functional to receive the optical signals from a functionally coupled gaze sensor. The optical signals being indicative of a user's device-targeting gaze falling upon a device to be controlled. An aural recognition unit is operatively coupled to the controller unit and is functional to receive the aural signals from a functionally coupled aural sensor. The aural signals being indicative of verbal commands appropriate for controlling the selected device and a light source configurable to sufficiently reflect off a pair of eyes of a user and be detected by the gaze sensor.

36 Claims, 4 Drawing Sheets

U.S. PATENT DOCUMENTS

| | | | |
|---|---|---|---|
| 6,535,139 | B1 | 3/2003 | Lindler |
| 6,535,854 | B2 | 3/2003 | Buchner |
| 6,637,883 | B1 * | 10/2003 | Tengshe et al. ............. 351/210 |
| 6,760,703 | B2 | 7/2004 | Kagoshima et al. |
| 6,804,643 | B1 | 10/2004 | Kiss |
| 6,811,492 | B1 | 11/2004 | Arakawa et al. |
| 6,853,739 | B2 | 2/2005 | Kyle |
| 6,873,314 | B1 | 3/2005 | Campbell |
| 7,306,337 | B2 * | 12/2007 | Ji et al. ....................... 351/209 |
| 2001/0041053 | A1 | 11/2001 | Abecassis |
| 2002/0126150 | A1 | 9/2002 | Parry |
| 2002/0180799 | A1 | 12/2002 | Peck et al. |
| 2003/0038754 | A1 | 2/2003 | Goldstein et al. |
| 2004/0075645 | A1 | 4/2004 | Taylor et al. |
| 2004/0224638 | A1 | 11/2004 | Fadell et al. |
| 2005/0012758 | A1 | 1/2005 | Christou |
| 2005/0028190 | A1 | 2/2005 | Rodriguez et al. |
| 2005/0047629 | A1 | 3/2005 | Farrell et al. |
| 2005/0108092 | A1 | 5/2005 | Campbell |
| 2005/0175218 | A1 | 8/2005 | Vertegaal et al. |
| 2005/0212749 | A1 | 9/2005 | Marvit et al. |
| 2006/0017692 | A1 | 1/2006 | Wehrenberg et al. |

OTHER PUBLICATIONS

Office Action from U.S. Appl. No. 11/466,374 dated Jan. 4, 2008.
Miastkowski, Stan "How it Works: Speech Recognition", PC World, Apr. 14, 2000, pp. 1-5, 1-5.
Rosenberg, Louis B., U.S. Appl. No. 11/278,369, filed Mar. 31, 2006.
Rosenberg, Louis B., U.S. Appl. No. 11/466,374, filed Aug. 22, 2006.
Rosenberg, Louis B., U.S. Appl. No. 11/465,777, filed Aug. 18, 2006.
Rosenberg, Louis B., U.S. Appl. No. 11/535,430, filed Sep. 26, 2006.
Rosenberg, Louis B., U.S. Appl. No. 11/535,423, filed Sep. 26, 2006.
Rosenberg, Louis B., U.S. Appl. No. 11/562,082, filed Nov. 21, 2006.
Rosenberg, Louis B., U.S. Appl. No. 11/267,079, filed Nov. 3, 2005.
Zhai, Morimoto et al. "Manual and Gaze Input Cascaded (Magic) Pointing", Conference on Human Factors in Computing Systems; May 1999; pp. 2460253; ACM Press, New York, NY, USA, 246-253.

* cited by examiner

GAZE DISCRIMINATING ELECTRONIC CONTROL APPARATUS, SYSTEM, METHOD AND COMPUTER PROGRAM PRODUCT

CROSS-REFERENCE TO RELATED APPLICATIONS

This application is a non-provisional application claiming benefit and priority under 35 U.S.C. § 119(e) from applicant's co-pending U.S. provisional application Ser. No. 60/703,659, entitled, "Gaze-Selective Verbal Interface," filed on Jul. 28, 2005, to the instant inventor; said provisional application is hereby incorporated by reference in its entirety as fully set forth herein.

FEDERALLY SPONSORED RESEARCH AND DEVELOPMENT

Not Applicable

REFERENCE TO A MICROFICHE APPENDIX

Not Applicable

FIELD OF INVENTION

The various exemplary embodiments relate generally to an electronic control system, and more specifically to an apparatus, system, method and computer program product for controlling one or more electronic devices using generally contemporaneous visual gaze selection and voice commands.

BACKGROUND

Aural recognition systems have been developed to interact with electronic devices such as personal computers, automobile control systems, and home automation systems. In general, such systems allow users to issue commands to electronic devices by speaking commands comprised of words, phrases, or sentences, as a means of conveying a desired action to be taken by the electronic devices. For example, U.S. Pat. No. 4,827,520 which is hereby incorporated by reference discloses a voice activated control system that allows a driver of a car to control a variety of device functions by issuing verbal commands. For example, a user may control the windows, air conditioner, radio, or telephone by issuing a variety of verbal commands based upon a predefined vocabulary of words and phrases.

Because multiple devices are controlled by the verbal commands, the user must verbally convey both an indication of which device he or she desires to control and an indication of what action he wishes that device to take. This tends to be cumbersome, time-consuming, error prone, and often requires the user to remember a large vocabulary of very specific words, phrases, or names, to clearly distinguish between the multiple devices being controlled by the user. Unfortunately such a solution is cumbersome for the user, requiring lengthy and awkward command sequences that must be memorized and must be delivered correctly.

Another problem with the relevant art is distinguishing between intended commands and normal conversations between people. For example, two people may be having a conversation in a house having a voice activated control system as disclosed in U.S. Pat. No. 6,535,854 and hereby incorporated by reference; one person may say to the other person, "Do you think we should turn the radio on or listen to a CD?" The voice activated control system may detect the word combination "radio on" and respond by activating the radio. A number of methods have been attempted in the relevant art to help distinguish between actually intended verbal commands and other verbal utterances, many of which are processing intensive for the control system and requires the voice control system to monitor the context of all verbal utterances. Other methods increase the requirements of the user, for example, requiring the user to issue an identifying word or phrase such as "CONTROLLER—RADIO ON," as a means of informing the system that the words that follow the identifying word "CONTROLLER" will be a formal command. Again, such requirements for identifying words or phrases create an interface for the user that is cumbersome, time-consuming, error prone and requires that the user remember a large vocabulary.

What is needed is a more natural and intuitive way for a user to issue a verbal command to one of a plurality of electronic devices without having to verbally specify exactly which of the plurality of electronic devices the user is referring to. What is also needed is an improved way of distinguishing between intended verbal commands and other verbal utterances.

SUMMARY

In various exemplary embodiments, solutions are provided for many of the limitations associated with relevant art aural recognitions systems by combining contemporaneous visual device selection with a verbal command appropriate for controlling the visually selected device to be controlled. More specifically, a user issues a command to select a desired electronic device by looking in the direction of the desired one of the plurality of electronic devices while issuing a verbally uttered command, thus discriminating against other electronic devices that are not visually selected. This technique reduces the amount of verbal information that would otherwise need to be conveyed in order to both select and issue a desired command to the selected device.

In an exemplary apparatus embodiment, a discriminating gaze electronic control device is provided which comprises a controller unit. The controller includes a processor programmed to control a selected device in dependence on received generally contemporaneous aural and optical signals. A gaze sensing unit is coupled to the controller unit which is functional to receive the optical signals from a functionally coupled gaze sensor.

The gaze sensor provides optical signals indicative of a user's gaze which indicates the selection of a device to be controlled. In an embodiment, the gaze detection sensor is one of, a charge coupled device and a complimentary metal-oxide semiconductor configured to detect a pair of illuminated retinas and/or corneas. The optical signals are generated by a light source configurable to sufficiently illuminate the pair of retinas and/or corneas of a user to be detected by the gaze sensor. In an embodiment, the light source is an infrared light emitting diode. An aural recognition unit is coupled to the controller unit which is functional to receive the aural signals from a functionally coupled aural sensor indicative of verbal commands appropriate for controlling the selected device. In an embodiment, the aural sensor is a microphone.

In a related exemplary apparatus embodiment, a proximity detection unit is coupled to the controller unit functional to receive permissive activation signals from a functionally coupled proximity sensor disposed in a location likely to detect a user's presence.

In another related exemplary apparatus embodiment the controller unit further includes a discriminator circuit coupled to the processor which is functional to reject non-contemporaneous aural or optical signals from unintentionally selected gaze targets.

In a third related exemplary apparatus embodiment, the controller unit, the gaze sensing unit and the aural recognition unit are installed in a common container affixed to or in proximity to a device to be gaze selected by the user.

In a fourth related exemplary apparatus embodiment, either the gaze sensor or the light source is disposed on a pair of eyeglasses worn by the user.

In a fifth related exemplary apparatus embodiment, the aural recognition unit is configured to recognize aural commands of a specific user.

In a sixth related exemplary apparatus embodiment, the controller unit includes a gaze residence time circuit configured to determine whether the gaze target has been viewed for a sufficient amount of time to allow for selection.

In an exemplary systematic embodiment, a discriminating gaze electronic control system is provided which comprises a controller unit comprising a processor programmed to control a selected device in dependence on generally contemporaneous aural and optical signals; a gaze sensing unit coupled to the controller unit functional to receive the optical signals from a plurality of functionally coupled gaze sensors indicative of a user's device-targeting gaze of one of a plurality of electronic devices; an aural recognition unit coupled to the controller unit functional to receive the aural signals from at least one functionally coupled aural sensor indicative of verbal commands appropriate for controlling one of a plurality of electronic devices; and a plurality of light sources configurable to sufficiently illuminate a pair of retinas and/or corneas of a user to be detected by at least one of the plurality of gaze sensors.

In a related exemplary systematic embodiment, at least a portion of the plurality of gaze detection sensors is disposed in close visual proximity to a plurality of separate devices to be controlled.

In another related exemplary systematic embodiment, at least a portion of the plurality of light sources are in close visual proximity to the plurality of gaze detection sensors but aligned such that only the illuminated retinas and/or corneas are substantially detected by the gaze detection sensors.

In a third related exemplary systematic embodiment, each of the plurality of light sources emits a distinctive illumination signal assigned to a device to be controlled and distinguishable by the gaze sensing unit.

In a fourth related exemplary systematic embodiment, at least the pluralities of gaze sensors are functionally coupled to the gaze sensing unit over a communications network.

In a fifth related exemplary systematic embodiment, the communications network is one of, a wired network, a wireless network and an electrical power network.

In an exemplary methodic embodiment, a method for providing a discriminating gaze electronic control apparatus which comprises; providing a controller unit comprising a processor programmed to control a device in dependence on generally contemporaneous aural and optical signals; providing a gaze sensing unit coupled to the controller unit functional to receive the optical signals from a functionally coupled gaze sensor indicative of a user's device-targeting gaze of a device to be controlled; providing an aural recognition unit coupled to the controller unit functional to receive the aural signals from a functionally coupled aural sensor indicative of verbal commands appropriate for controlling the selected device; and providing a light source configurable to sufficiently illuminate a pair of retinas and/or corneas of a user to be detected by the gaze sensor.

In a related exemplary methodic embodiment, the method further comprises providing an interface unit for operatively coupling the discriminating gaze electronic control apparatus to the device to be controlled.

In another related exemplary methodic embodiment, the method further comprises disposing at least the controller unit, the gaze sensing unit and the aural recognition unit in a single container.

In a third related exemplary methodic embodiment, the container is configured to be one of; directly coupled to the device, disposed in close proximity to the device and remotely disposed.

In a fourth related exemplary methodic embodiment, the remotely disposed container is configured to be remotely operated by coupling at least the gaze sensor and the aural sensor to a communication network in processing communications with the controller unit.

In a fifth related exemplary methodic embodiment, the programming comprises determining a gaze selected target in dependence on the optical signals received from the gaze sensing unit; determining an appropriate control action in dependence on the aural signals received from the aural recognition unit; and discriminating against the optical signals or the aural signals which are not generally received contemporaneously.

In an exemplary computer program product embodiment, computer readable media embodied in a tangible form comprising executable instructions by a processor associated with a discriminating gaze electronic control apparatus are provided to; determine a gaze selected target in dependence on optical signals received from a gaze sensing unit; determine an appropriate control action in dependence on aural signals received from a aural recognition unit; discriminate against optical signals or aural signals which are not generally received contemporaneously; or else send a command to an interface unit associated with a device to be controlled In a related exemplary computer program product embodiment, the appropriate control action is associated with a device to be controlled through an interface unit.

In another related exemplary computer program product embodiment, the tangible form comprises magnetic media, optical media or logical media.

BRIEF DESCRIPTION OF DRAWINGS

The features and advantages of the various exemplary inventive embodiments will become apparent from the following detailed description when considered in conjunction with the accompanying drawings. Where possible, the same reference numerals and characters are used to denote like features, elements, components or portions of the various embodiments described herein. Optional components or feature are generally shown in dashed lines. It is intended that changes and modifications can be made to the described embodiment without departing from the true scope and spirit of the various embodiments as defined by the claims.

DETAILED DESCRIPTION

In various embodiments, an apparatus, system, method and computer program product are provided which enables a user to selectively issue a voice command to one of a plurality of separately located electronic devices by verbally producing a spoken command combined with a contemporaneous visual selection made by producing an appropriately directed gaze. By appropriately directed gaze, it is meant herein that the user aims his or her visual gaze substantially in the direction of the one of the separately located electronic devices or a portion thereof. The appropriately directed gaze is referred to herein as a device-targeting gaze and generally must fall within certain close physical proximity of one of the separately located electronic devices, or a portion thereof, for more than a certain threshold amount of time. Furthermore, by contemporaneous visual selection it is meant herein that a device-targeting gaze is produced by the user within certain close time-proximity of the spoken command for the spoken command to be selectively issued to the one of the plurality of separately located electronic devices. In this way a user can direct a verbal command at one of a plurality of separately located electronic devices by gazing upon the desired electronic device or a portion thereof for more than a threshold amount of time and within certain time proximity of the issuing the spoken command The various embodiments described are particularly well suited to improve systems such as home automation systems where a plurality of electronic devices, each located at a different spatial location within the user's environment, may be controlled by a user through voice commands. More specifically, a system comprising a aural recognition unit, a gaze sensing unit, and a controller unit, that cooperate to enable a user to selectively issue one or more commands to one of a plurality of spatially separated electronic devices through the contemporaneous act of uttering a spoken word or phrase while delivering an appropriate device targeting gaze. As provided herein, the aural recognition unit, the gaze sensing unit, and the controller unit may be comprised of both hardware and software components. Also, as provided herein, the aural recognition unit, the gaze sensing unit, and the controller unit may be comprised of separate components and/or may be integrated into a unitary system. Where necessary, computer programs, routines and algorithms are envisioned to be programmed in a high level object oriented language, for example Java™ C++, C, C#, or Visual Basic™.

Figure 1:
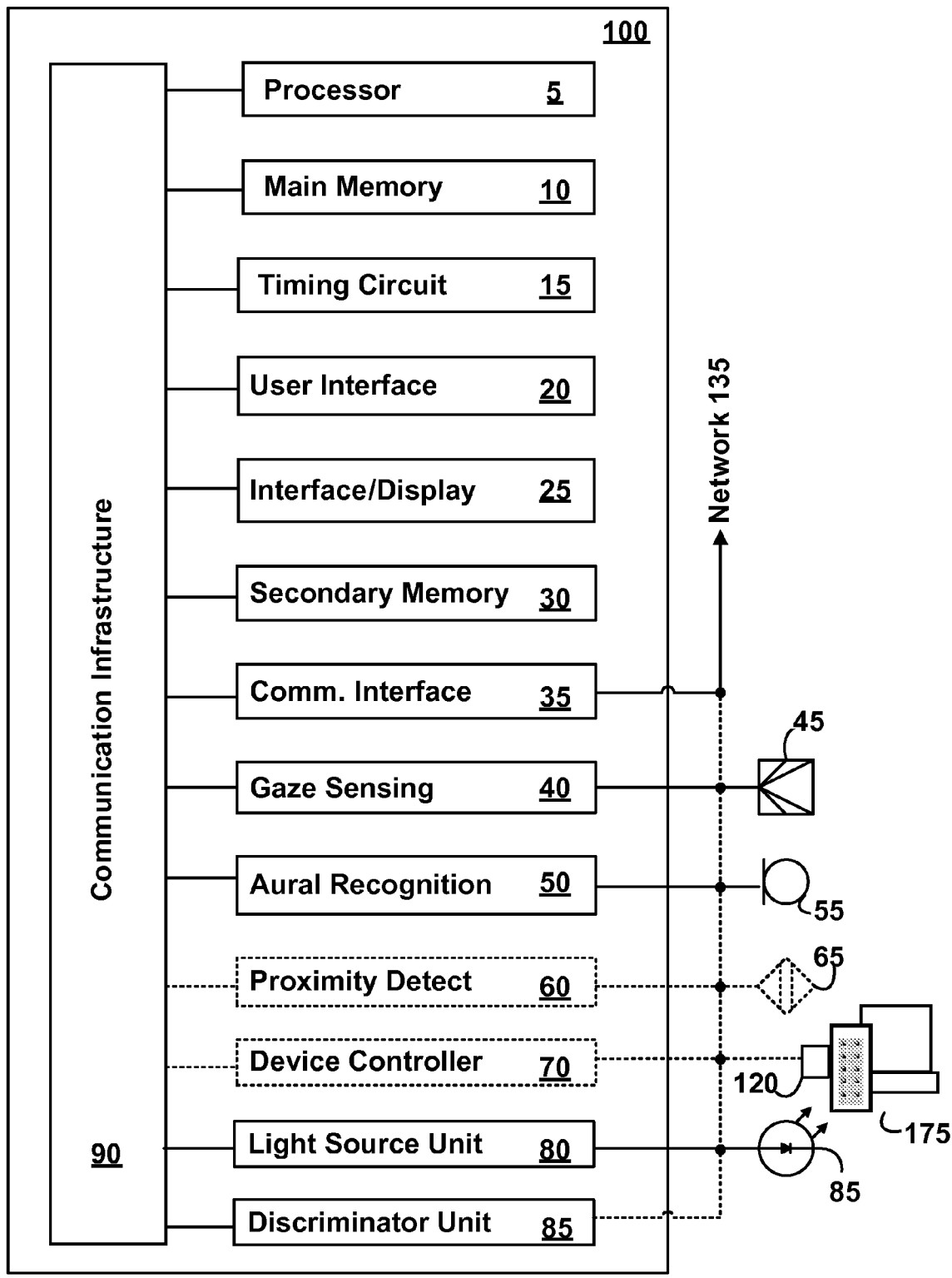
FIG. 1 depicts an exemplary block diagram of an embodiment of a controller unit.

Referring to FIG. 1, an exemplary and generalized block diagram embodiment of a controller unit 100 is provided. The controller unit 100 includes a communications infrastructure 90 used to transfer data, memory addresses where data files are to be found and control signals among the various components and subsystems associated with the controller 100.

A processor 5 is provided to interpret and execute logical instructions stored in the main memory 10. The main memory 10 is the primary general purpose storage area for instructions and data to be processed by the processor 5. A timing circuit 15 is provided to coordinate programmatic activities within the controller 100 and interaction with a plurality of subsystems and devices coupled to thereto. The timing circuit 15 may be used as a watchdog timer, clock or a counter arrangement and may be programmable.

The main processor 5, main memory 10 and timing circuit 15 are directly coupled to the communications infrastructure 90. A user interface 20 and an interface/display 25 subsystem are provided to allow user interaction with the controller unit 100. The user interface 20 and display 25 may be a simple LED display with pushbuttons or in another embodiment incorporate a graphical display with touch sensitive user controllers. The user interface 20 and display 25 are electrically coupled to the communications infrastructure 90. The user interface may be used, for example, to enable configuration and/or calibration processes to be engaged by a user of the system.

A secondary memory subsystem 30 is provided which may house retrievable storage units or logical memory. In an embodiment, an EEPROM may be included in the secondary memory subsystem 30, encoded with one or programs and/or data used in the various embodiments described herein.

A generalized communications interface 35 subsystem is provided which allows the controller unit 100 to communicate over a network 135 with the various electronic devices 175, sensors 45, 55, 65, 85 and other computer systems (not shown) which may be coupled to the network 135. In an embodiment, the network 135 may be of a radio frequency type normally associated with computer networks for example, wireless computer networks based on infrared, various IEEE standards 802.11x, where x denotes the various present and evolving wireless computing standards, for example Home RF, Bluetooth™, WiMax 802.16 and WRANG 802.22.

Alternately, digital cellular communications formats compatible with for example GSM, 3G, CDMA, TDMA and evolving cellular communications standards. In a third alternative embodiment, the network 135 may include hybrids of computer communications standards, cellular standards, cable television networks and/or evolving satellite radio standards.

A gaze sensing unit 40 is provided which includes the circuitry necessary for determining which one among a plurality of electronic devices 175, a user has selected for control based on detecting a user's device-targeting gaze. In an embodiment, the gaze sensing unit 40 is a circuit board coupled to the communications infrastructure 90 of associated with the controller unit 100. An external gaze sensor 45 is coupled to the gaze sensing unit 40 either by a separate connection(s) or via the network 135. A plurality of gaze sensors 45 (FIG. 1A) may be provided, for example, for each of a plurality of gaze-selectable electronic device (i.e. device 175 and device 165) such that a user's gaze may be discriminated from among the plurality of separately located gaze-selectable devices. In some embodiments, a plurality of gaze sensors 45 may be associated with a single electronic device such that the electronic device may be selected through a variety of device-targeting gazes. In another example, a light fixture electronic device may be configured with one gaze sensor 45 proximal to the light bulb portion and one gaze sensor 45 proximal to the wall switch portion such that a user may issue a device-targeting gaze at the light fixture electronic device by gazing either substantially in the direction of the light bulb portion or substantially in the direction of the light switch portion. In a related example, a stereo electronic device may be configured with one gaze sensor 45 proximal to the stereo tuner portion and one gaze sensor 45 proximal to each speaker portion such that a user may issue a device-targeting gaze at the stereo electronic device by gazing either substantially in the direction of the stereo tuner portion or substantially in the direction of any of the stereo speaker portions.

In an embodiment, the gaze sensors 45 comprise simple imaging devices for example, charged coupled devices (CCD) or complementary metal oxide semiconductor (CMOS) technologies to detect optically induced reflections caused by a light source unit 80 incident on the retinas and/or corneas of a user. In other embodiments, the gaze sensor 45 may include a single or plurality of other light sensing units such as photodiodes and/or photo-detectors to detect optically induced reflections caused by a light source unit 80 incident on the retinas and/or corneas of a user. Because the retina is highly reflective and generally returns a substantial reflective signal only when a user is gazing substantially at a light source, an embodiment is generally configured such that a light source unit 80 is placed in close proximity to a gaze sensor 45. In this way the light emitted by a light source unit 80 that is in close proximity to gaze sensor 45, is only substantially reflected upon gaze sensor 45 when a user is gazing substantially in the direction of gaze sensor 45.

In one embodiment, the light source unit 80 comprises a non-coherent infrared light emitting diode (LED) 85. In another embodiment, the light source unit 80 comprises a coherent infrared LED 85. In another embodiment, the light source unit 80 modulates or otherwise encodes the output of the LED 85 to facilitate the identification and discrimination of optical energy that is reflected back with respect to other optical energy being received by the gaze sensors 45.

In various embodiments, the frequency shift of the reflected energy may be processed to determine the likelihood that it was reflected off a human retina prior to being received by a gaze sensor 45. This is because when light bounces off the blood vessels lining the retina of a person's eye, the reflected light includes a characteristic red-shifted frequency spectrum. The red-shifted frequency spectrum may be used by the gaze sensing unit 40 as a further means of discriminating an actual device selection from other optical "noise" detected by the gaze sensors 45.

A plurality of gaze determinative variables may be incorporated into a discriminator circuit to minimize improper electronic device selection including gaze time-thresholds, pre-vocalization gaze time-thresholds, intra-vocalization gaze time-thresholds, post-vocalization gaze time-thresholds, combined multiple thresholds, gaze-synchronization parameters, and combined usage of gaze time-thresholds and gaze-synchronization parameters as is discussed below.

One or more gaze time-thresholds may also be used to determine if a device selection was detected by a gaze sensor 45. For example a Minimum Gaze Time-Threshold may be used, the minimum gaze time-threshold being a minimum time for which a gaze must be detected by one or more gaze sensors 45 for it to be determined to be a deliberate targeting gaze and not spurious gazes. The minimum gaze time-threshold is preferably set to a sufficiently large enough time duration to discriminate against spurious gazes but short enough time duration not to require a user to maintain a gaze for longer than a user may comfortably desire to register his or her gaze intent.

For example, a minimum gaze time-threshold may be set at 1000 milliseconds such that a user must maintain be detected by a particular gaze sensor 45 for a minimum of 1000 milliseconds for that gaze to be determined by the gaze sensing unit as a device selection.

In addition, the gaze sensing unit 40 may be configured to discriminate against momentary gaze-hit interruptions caused by the blinking of the eyes by the user. These interruptions are very rapid, on the order of less than 200 milliseconds, usually substantially less. Thus, for example, the gaze sensing unit 40 may be configured to ignore any brief interruptions in a gaze-hit that last less than 200 milliseconds by configuring a gaze sensor polling frequency of greater than 200 milliseconds.

In an embodiment, these various timing parameters are processed by a discriminator unit 85 coupled to the communications infrastructure 90. The discriminator unit 85 provides the necessary aural and optical coincidence signal processing to allow discrimination of background and/or optical noise encountered in the environment.

To further discriminate against fleeting glances, a plurality of other gaze time-thresholds may be used in various embodiments. These thresholds are described as follows:

Pre-vocalization Gaze Time-Threshold: In various embodiments, the user's gaze must be detected upon a target electronic device for a certain amount of time prior to the issuance of a verbal command in order for that verbal command to be directed at the target electronic device. This certain amount of time is referred to herein as the Pre-vocalization Gaze Time-Threshold and is generally a minimum number of milliseconds that a user's gaze must fall upon a target electronic device immediately prior to issuing a verbal command for that command to be directed to and/or enacted upon the target appliance. In some embodiments, the pre-vocalization gaze time-threshold is set to approximately 800 milliseconds. In some such embodiments, the detected gaze must continue until the verbal command has at least begun. Thus, the user's gaze must be directed upon the target electronic device for at least the threshold number of milliseconds immediately prior to issuance of the verbal command for that verbal command to be directed to and/or enacted upon the target appliance.

Intra-vocalization Gaze Time-Threshold: In some embodiments, the user's gaze must be detected upon a target electronic device for a certain amount of time during the issuance of a verbal command in order for that verbal command to be directed toward the target electronic device. This certain amount of time is referred to herein as the Intra-vocalization Gaze time-threshold and is generally a minimum number of milliseconds that a user's gaze must fall upon a target electronic device during or generally concurrent with issuing a verbal command for that command to be directed to and/or enacted upon the target electronic device.

In some embodiments, the intra-vocalization gaze time-threshold is set to a fixed time value such as 1250 milliseconds. In some embodiments, the intra-vocalization gaze time-threshold is set to a time value that is dependent upon the duration of the vocal command. In some such embodiments, the longer the vocal command, the longer the intra-vocalization gaze time-threshold. In some such embodiments the intra-vocalization gaze time-threshold is set to a percentage of the time duration of the vocal command itself. In some such embodiments, the percentage is approximately 100%, thereby requiring that the user's gaze fall upon the target electronic device for substantially the full duration of the issued focal command in order for that verbal command to be directed at the target electronic device.

Post-vocalization Gaze Time-Threshold: In some embodiments, the user's gaze must be detected upon a target electronic device for a certain amount of time after to the issuance of a verbal command in order for that verbal command to be directed at the target electronic device. This certain amount of time is referred to herein as the Post-vocalization Gaze Time-Threshold and is generally a minimum number of milliseconds that a user's gaze must linger upon a target electronic device after the completion of the issuance of a verbal command in order for that verbal command to be directed to and/or enacted upon the target appliance. In some embodiments, the post-vocalization gaze time-threshold is set to approximately 500 milliseconds.

Multiple Thresholds: In some embodiments, a Boolean combination of two or more of a Pre-vocalization Gaze Time-Threshold, an Intra-vocalization Gaze time-threshold, and a Post-vocalization Gaze Time-Threshold are used by the software to determine if an issued vocal command is to be directed at and/or enacted by a target electronic device that has been gazed upon by a user in coordination with an issued verbal command. For example, by using two of such thresholds in combination, the software can be configured to require a user to impart a gaze upon a target electronic device for a certain amount of time prior to issuing a verbal command and for a certain amount of time duration during the issuance of a verbal command in order for that verbal command to be directed to and/or enacted upon that target electronic device. In another example, the software can be configured to require a user to impart a gaze upon a target electronic device for a certain amount of time prior to issuing a verbal command or for a certain amount of time duration during the issuance of a verbal command in order for that verbal command to be directed to and/or enacted upon that target electronic device.

Gaze-Synchronization Parameters: In addition to or instead of the gaze time-thresholds described above, may be employ gaze-synchronization parameters that must be met with respect to a particular target electronic device in order for an uttered verbal command to be directed to and/or enacted upon that appliance. In some such embodiments a Start Gaze-Synchronization Parameter is defined such that the user's gaze must be detected upon a target electronic device at the start of the issuance of a verbal command in order for that verbal command to be directed to and/or enacted upon the target appliance. In such embodiments, a Cease Gaze-Synchronization Parameter is defined such that the user's gaze must be detected upon a target electronic device at the cessation of the issuance of a verbal command in order for that verbal command to be directed to and/or enacted upon the target appliance. In some such embodiments a Word-Specific Gaze-Synchronization Parameter is defined such that the user's gaze must be detected upon a target electronic device during the utterance of one or more particular words that are included within a particular verbal command in order for that verbal command to be directed to and/or enacted upon the target appliance.

Combined Usage of Gaze Time-Thresholds and Gaze-Synchronization Parameters: In some embodiments, one or more Gaze Time-Thresholds as described above are used in combination with one or more Gaze-Synchronization Parameters as described above in order to determine if a particular vocal command should be directed at or enacted upon a particular electronic device that has been gaze upon. In one such combination a Start Gaze-Synchronization Parameter is used in combination with an Intra-vocalization Gaze Time-Threshold by the software such that both requirements must be met in order for an issued verbal command to be directed to and/or enacted upon a target appliance that has been gazed upon. Such a combination creates the requirement that the user's gaze must be detected upon a target electronic device at the start of an issued verbal command and for a certain period or portion of the duration of the issued verbal command for in order for the issued verbal command to be directed to and/or enacted upon that target appliance. In another example combination a Cease Gaze-Synchronization Parameter is used in combination with an Intra-vocalization Gaze Time-Threshold by the software such that both requirements must be met in order for an issued verbal command to be directed to and/or enacted upon a target appliance that has been gazed upon. Such a combination creates the requirement that the user's gaze must be detected upon a target electronic device for a certain period or portion of the duration of the issued verbal command and must be detected upon the target electronic device at the cessation of the issued verbal command in order for the issued verbal command to be directed to and/or enacted upon that target appliance.

In certain embodiments, it may be desirable to determine if a gaze falling upon a particular electronic device is a human gaze and not a gaze from some other life form such as a cat or dog which may be in the user's environment. A number of factors may be used by the gaze sensing unit 40 to distinguish a human gaze such as the size, shape, and spacing of the reflected retinal dots. Another factor that might be used is frequency content. As mentioned above, when light bounces off the blood vessels lining the retina of a human's eye, includes a characteristic red-shifted frequency spectrum. In cats and dogs, the shift in frequency spectrum is different because dogs and cats and many other animals have a reflective membrane in their eyes called the tapetum lucidum, which helps their night vision. The tapetum lucidum reflects light more efficiently than a human retina, causing a brighter reflection, and tends to shift the frequency more towards green, yellow or blue. Thus the intensity and/or frequency content of the reflected energy can be used by the gaze sensing unit 40 to distinguish a human gaze from the gaze of a dog, cat, or other animal.

Various technologies are available in the relevant art which may be adapted to perform gaze detection. For example, ISCAN, Inc.™ of Cambridge, Mass. provides a range of products, usually referred to as eye-trackers or gaze-trackers, for performing such functions. The tracking technology is most commonly used as a means of replacing a mouse or trackball in the cursor control interactions of a user, allowing the user to perform hands-free operation of standard computer functions.

In various other user interface examples, many utilize eye-tracking hardware to allow a user to achieve hands-free control of the pointing device for a personal computer as is disclosed in U.S. Pat. Nos. 5,751,260; 5,861,940; 6,243,076 and pending U.S. patent applications 20050047629 and 20040075645. The aforementioned US patents and pending patent applications are hereby incorporated by reference in their entirety as if fully set forth herein. The various embodiments of the gaze sensors 45 described herein do not require eye-tracking. The gaze sensors 45 need only detect light reflected from the eyes of a user. In some embodiments, the detected light reflected off the eyes of the user are reflected substantially from the retinal portion of each eye of the user, the light passing through the pupil of each the eye. In some embodiments the detected reflected light off the eyes of the user are reflected substantially off the cornea portion of each of the user, the light not passing through the pupil of each of the eye. In some embodiments, one or more optical components, for example, optical lenses may be used in conjunction with the gaze sensors 45 to increase the depth of field and/or expand the detectible field of view.

Figure 1A:
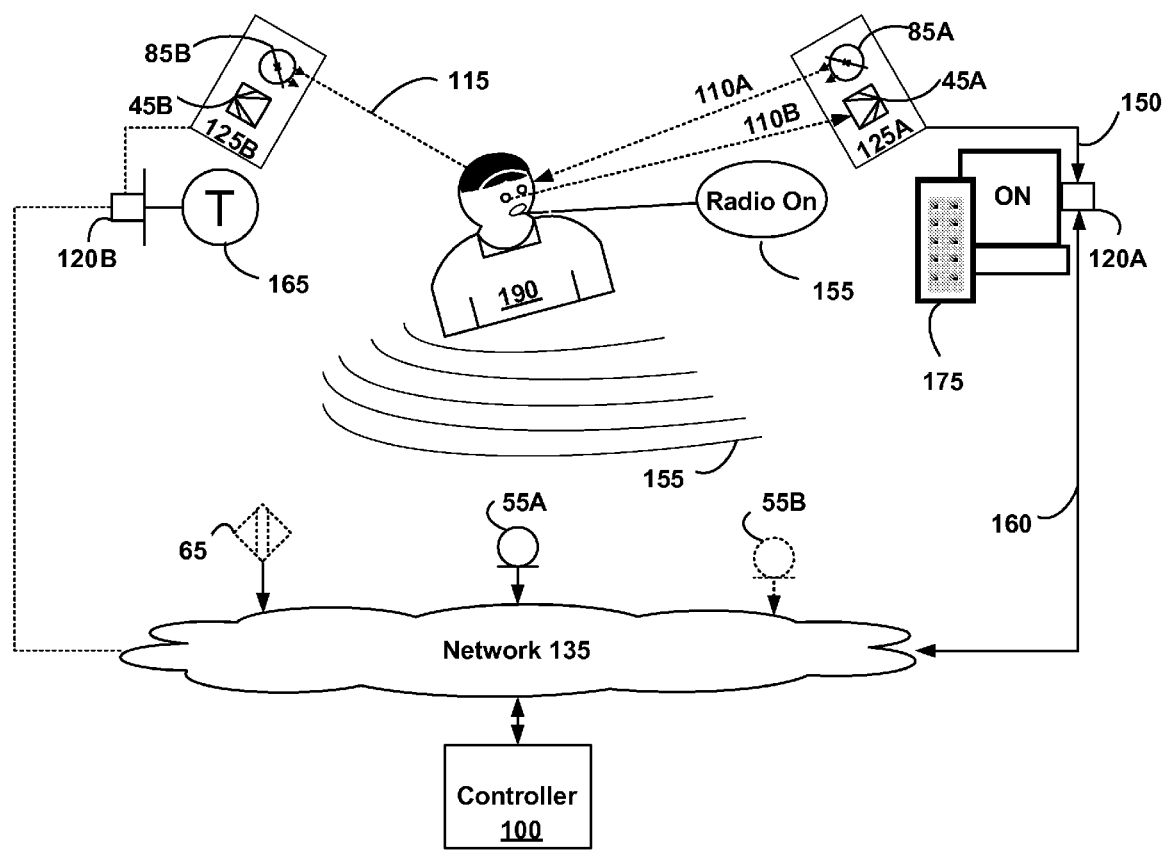
FIG. 1A depicts a general exemplary embodiment in which a user visually selects a electronic device and utters an appropriate aural command.

In certain embodiments, of gaze sensors 45 may be configured using low cost components to detect the characteristic reflection off the retina of a user's eyes commonly known as "red-eye" to determine if a user is specifically gazing in the direction of a particular gaze sensor 45 associated with a particular controllable electronic device 175. In one such embodiment, the gaze sensor 45 and light source 80 are configured in close proximity and are positioned upon a target electronic device. For example, as shown in FIG. 1A, gaze sensor 45A and light source 85A are configured in close proximity to each other and are together positioned in close proximity to the electronic device 175 or a portion thereof. A gaze sensor 45A may be a CCD image sensor as described previously; the CCD image sensor may be configured with infrared detection capability. The emitting light source 85A may be an infrared LED as described previously, the LED may be modulated with a particular carrier frequency such that it can be easily distinguished from the background optical noise. The light source 85A and gaze sensor 45A are configured such that light from the source 85A does not fall substantially upon the sensor 45A unless it is reflected off an external body. When a user 190 gazes substantially in the direction of the electronic device 175, or a portion thereof, direct light 110A from the source 85A is reflected 110B off the eyes of the user, substantially as a result of retinal reflectivity, and is directed back towards the sensor 45A.

This reflected light signal 110B detected by sensor 45A is processed by circuitry and/or routines to determine if it is indicative of a human gaze, if the gaze was intentional rather than spurious, and/or if the gaze was substantially contemporaneous with an issued verbal command. As part of the processing, the detected light signal may be distinguished form background noise based upon the presence of the particular carrier frequency or encoding. In addition, the detected light signal 110B may be determined as a human gaze as a result of the intensity of the signal, the frequency shift present in the signal, the presence and/or the spacing of a pair of retinal dots detected in the signal. As part of the processing, the detected light signal 110B may be compared against timing thresholds and parameters as described previously to determine if the gaze was intentional rather than spurious and/or to determine if the gaze met any specified timing requirements with respect to an uttered verbal command. In this way, the various embodiments may be configured to determine if user 190 is gazing upon electronic device 175, if that gaze was intentional, and if that gaze was contemporaneous with an uttered verbal command from user 190.

In other embodiments, gaze sensors 45 may be configured to detect characteristic reflections off the corneas of a user's eyes to determine if a user is specifically gazing in the direction of a particular gaze sensor 45 associated with a particular controllable electronic device 175. As with the retinal reflection embodiments, the corneal reflection embodiments may be configured such that the gaze sensor 45 and the light source 80 are in close physical proximity and are positioned upon or substantially near a target electronic device or a portion thereof. For example, as shown in FIG. 1A, gaze sensor 45A and light source 85A are configured in close physical proximity to each other and are together positioned in close physical proximity to electronic device 175 or a portion thereof. For example, if the electronic device 175 was a lighting fixture, the gaze sensor 45A and the light source 85A may be configured in close proximity to each other and positioned such that they are both upon or within close proximity to a light switch element or other control element associated with the lighting fixture. The gaze sensor 45A may be a CCD image sensor as described previously; the CCD image sensor may be configured with infrared detection capability. The light source 85A may be an infrared LED as described previously, the LED may be modulated with a particular carrier frequency or digital encoding such that it can be easily distinguished from the background optical noise. In such a corneal detection embodiment, configuration of the image processing routines is performed upon the image data collected by the CCD image sensor to determine if a user is gazing substantially in the direction of the sensor/light source pair. The image processing routines may be operative to detect whether the reflected light from the light source 85A is present the image data collected by gaze sensor 45A in a characteristic manner that indicates a user is gazing substantially in the direction of the light source/image sensor pair. In some such embodiments, the aforementioned characteristic manner is such that a pair of bright corneal reflections, each one referred to herein as a hotspot, may be detected in the image data with a sizing and/or spacing and/or intensity that is characteristic of reflecting off a pair of human eyes. In addition, the aforementioned characteristic manner may be such that each of the pair of characteristic hotspot corneal reflections is substantially centered within one of the pupils of the user's eyes. This is because when a user is looking substantially in the direction of the light source/image sensor pair, each one of the detected hotspot reflections of the pair of detected hotspot reflections will be located substantially at or near the geometric center of the dark circular pupil region of one of the user's eyes.

Thus, the image processing routines employed by the gaze sensing unit 40 or controller 100 may be configured to detect and/or quantify the degree to which each of the pair of detected hotspot reflections are centered within a detected dark circular region of the user's eye characteristic of a human pupil. If the image data is such that a pair of detected hotspot reflections is detected with a size, spacing and/or intensity that is characteristic of a corneal reflection off a pair human eyes, and if the image data is such that each of the hotspot corneal reflections is substantially centered within a detected dark circular region characteristic of a human pupil, the image processing routines may be configured determine that a human user is gazing substantially in the direction of the light source/image sensor pair. The image processing routines may then be further operative to determine whether the detected gaze was intentional or spurious as described previously and/or whether the gaze was substantially contemporaneous with an issued verbal command as described previously.

For example, the detected gaze in the image sensor data may be compared against timing thresholds and/or other timing parameters to determine whether the gaze was intentional, spurious and/or whether the gaze met specified timing requirements with respect to an uttered verbal command. In this way, the various embodiments may be configured to determine if a user 190 is gazing upon the electronic device 175, if that gaze was intentional, and if that gaze was contemporaneous with an uttered verbal command. In addition, it should be noted that as part of the aforementioned image processing, the detected corneal reflection may be distinguished form background noise based upon the detected presence of a particular carrier frequency or digital encoding in the detected hotspot reflection, the particular carrier frequency being that employed by one or more particular light source elements.

Referring back to FIG. 1, an aural recognition unit 50 is provided which includes the circuitry necessary for determining what command is to be sent to an interface unit 120 coupled to the selected target device 175 which has been visually selected by the user. The aural recognition unit 50 is electrically coupled to the communications infrastructure 90. One or more aural sensors 55 may be coupled to the aural recognition unit 50 to capture commands issued by one or more users. In an embodiment, the aural sensors 55 comprise one or more microphones disposed in locations likely to detect commands associated with the target devices 175 visually selected by the user(s). The aural sensors 55 may be coupled to the aural recognition unit 50 either by a separate connection(s) or via the network 135. Alternately, the aural sensors 55 are incorporated within or upon one or more of the local interface devices 120 which controls the various electronic devices 165, 175. In an embodiment, an optional separate device controller unit 70 is coupled to the communications infrastructure 90 for specialized applications. For example, when controlling high current demand devices such as electrical motors, lighting and HVAC systems.

Aural recognition technologies for transforming aural sounds into computer recognizable actions are generally known in the relevant art. For example, U.S. Pat. Nos. 5,036,539 and 5,005,203 describe detailed methods and apparatus for converting spoken utterances from a user into machine readable representations. The latter and former patents are hereby incorporated by reference in their entirety as if fully set forth herein.

In addition, U.S. Pat. Nos. 6,513,006 and 6,535,854 disclose systems for controlling home appliances using an aural recognition unit 50 as the primary means of user input. Generally, aural recognition units 50 employs circuitry that transforms input signals representing aural utterances, as captured by one or more aural sensors 55, into discrete digital representations that are compared to stored digital representations in a library of digital words used as commands to control the various electronic devices 165, 175. The input aural signals 155 (FIG. 1A) are "recognized" using statistical algorithms or comparators to detect a match with a corresponding command word stored in a digital library. The latter and former patents are hereby incorporated by reference in their entirety as if fully set forth herein In an embodiment, the aural recognition unit 50 may be configured for one or more modes of operation. For example, in a user-dependent mode, only users known to the controller 100 may control the various electronic devices 165, 175 or in a user-independent mode where any user may control the various electronic devices 165, 175.

The user-dependent mode may require each authorized user to provide sample commands using a calibration or set-up routine. Although the aural recognition unit 50 may be provided in various forms, the aural recognition 50 in a preferred embodiment generally comprises one or more processors running aural recognition routines. The aural recognition unit 50 includes the necessary "digital vocabulary" and/or grammar rules to determine and select commands appropriate for a visually selected target device 165, 175.

In an optional embodiment, a proximity detection unit 60 may be provided which minimizes power drain of the various remotely coupled devices 45, 55, 65, 85 when no users are present. The proximity detection unit 60 may be electrically coupled to the communications infrastructure 90 or provided locally in the interface devices 120 (FIG. 1A) which controls the various electronic devices 175. The proximity detection unit 60 includes one or motion sensors 65 which provide signals to the proximity detection unit 60 for determining whether to place the various remotely coupled devices 45, 55, 65, 85 in a sleep or active state. The motion sensors 65 may be coupled to the proximity detection unit 60 either by a separate connection(s) or via the network 135.

Referring again to FIG. 1A, an exemplary operational embodiment is depicted in which a user 190 utters an aural command 155, for example, "RADIO ON," while contemporaneously visually selecting a radio 175 for operation. In this exemplary embodiment, the light emitter 85 is contained in an integrated unit 125A with a gaze sensor 45A. The integrated unit 125A is disposed in close visual proximity to the radio 175. One or more separate aural sensors 55A, 55B are disposed in a nearby location, generally within the same room as the radio 175. The light 110A emitted by the light emitter 85A causes the retinas of the user 190 to reflect 110B back to the gaze sensor 45A which sends a device selection signal 150 over the network 135 for processing by the Controller 100. One or more of the aural sensors 55A, 55B sends an electrical representation of the aural command "RADIO ON" 155 over the network 135 to the controller 100 for processing.

The controller 100 determines if the aural command 155 is sufficiently contemporaneous with the visual selection of the radio 175 by the user 190. One or more gaze time-thresholds and/or gaze-synchronization parameters may be employed in this processing step as described previously. Upon affirmative determination by the controller 100, an ON command is sent 160 to an interface unit 120A coupled to the radio 175 which turns the radio 175 ON. If the aural command 155 and the visual selection of the radio 175 are not sufficiently contemporaneous, the visual selection 110A, B and aural command 155 are ignored.

If another electronic device 165 is in visual proximity to the user 190 but its associated light emitter 85B and associated gaze sensor 45B are not aligned to receive light 115 reflected from the retinas and/or corneas of the user 190, the second electronic device 165 is not visually selected and any aural commands 155 which may otherwise be appropriate to this second electronic device 165 are ignored.

In an optional embodiment, a motion sensor 65 may be disposed in an area likely to be triggered by the user 190 to allow activation of the electronic devices 165, 175 in visual proximity to the user 190. For example, light emitters of devices 165 and 175 may only become active if motion sensor 65 determines that a user is present in the area. In this way power is not wasted upon light emission.

In an alternate embodiment, light emitters 85A and 85B are turned on only when a voice signal 155 is detected by the aural recognition unit 50. In such an embodiment, a voice signal may be detected within a short time period by aural recognition unit 50, for example, within the first 250 milliseconds of an issued voice command 155 from the user 190. Upon detection that the user is in the process of issuing a voice command, the controller may be operative to activate light emitters 85A, 85B. Because the voice command 155 has only just begun, there is still substantial time left to determine if the user is gazing at an electronic device based during the remainder of the voice command. Upon completion of the voice command, the controller unit 100 may be configured to deactivate the light emitters 85A, 85B. Such a configuration is well adapted to reducing power consumption by the light emitters, turning on the light sources only during a voice command, otherwise keeping them off. Also in some such embodiments the light emitter may be pulsed while active to further conserve power. For example, the light emitter may be pulsed at a rate of 2 to 5 Hertz to reduce power consumption. This pulsing of the emitter may also be used as a carrier frequency for noise differentiation as described previously.

Figure 1B:
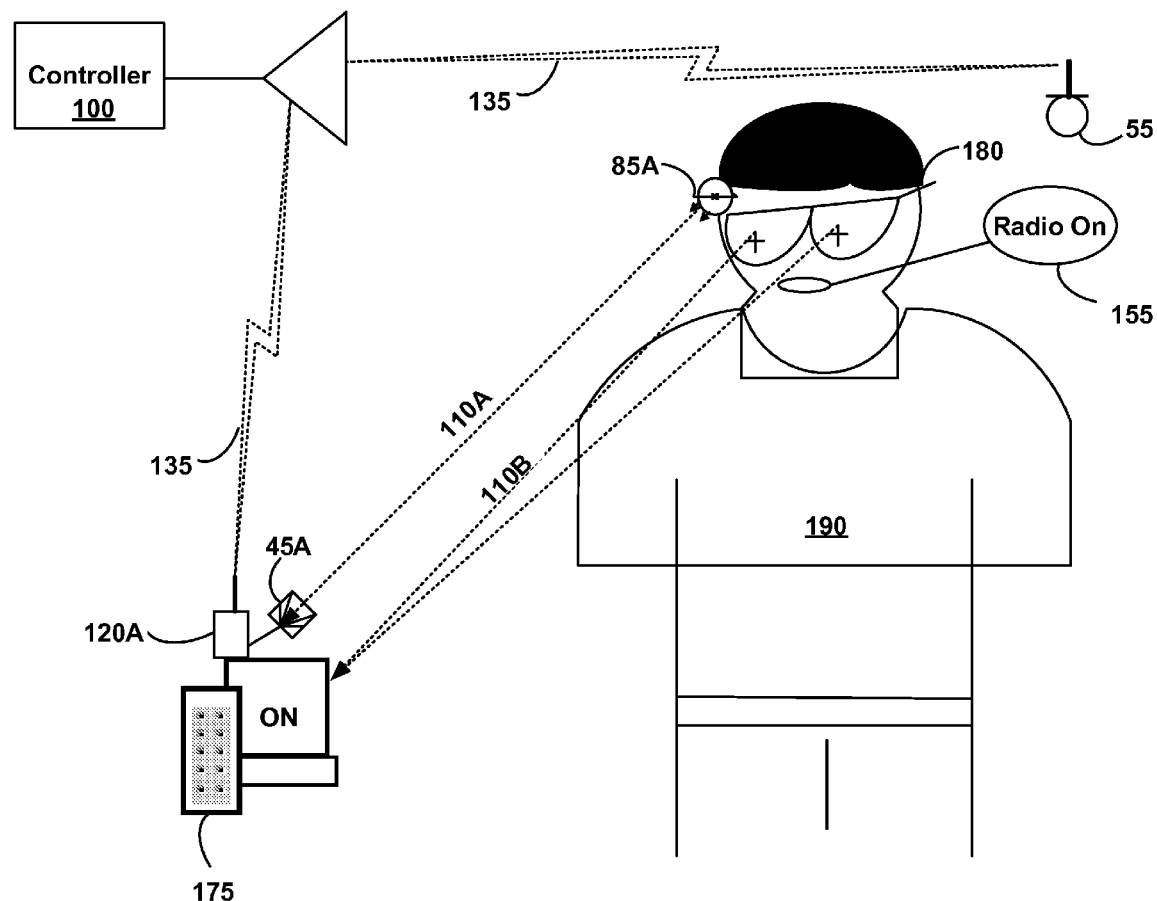
FIG. 1B depicts another general exemplary embodiment in which the user, wearing appropriately equipped headset visually selects a electronic device and utters an appropriate aural command.

An exemplary alternate embodiment is provided in FIG. 1B. In this alternate embodiment, a user 190 is provided with eyeglasses, a headset, and/or other head-worn element having at least one light emitter 85A coupled to the head-worn frame and aligned to illuminate a gaze sensor 45A in the general vicinity in which the user is viewing. An optional set of cross hairs may be included in the lenses of the eyeglasses to assist the user 190 in directing the light beam 110A to align with user's gaze 110B. One skilled in the art will appreciate that the light emitter 85A and the gaze detector 45A may be reversed such that the light emitter 85A is located in close proximity to the target device 175 and the gaze detector 45A located on the head-worn frame with a suitable wireless network connection 135 to the controller 100. In either arrangement, the electronic device 175 is suitably coupled to an interface device 120A. The interface device 120A has the gaze sensor 45A operatively coupled thereto and is disposed in close proximity to the electronic device 175.

The interface device 120A and an aural sensor 55 are coupled to the controller 100 over a wireless network 135. As described above, the user 190 utters a command 155, for example "RADIO ON" while contemporaneously viewing the target device to be selected 175. The controller 100 determines if the received aural command 155 and gaze detection 110A occurred sufficiently contemporaneously to send an ON command to the interface 120A. Assuming that the aural command 155 and gaze detection 110A are within permissible limits, the controller 100 sends the ON command to the interface device 120A which turns the radio 1750N. As before, if the aural command 155 and gaze detection 110A are not within permissible contemporaneous limits the aural and optical inputs are ignored and no command is sent to the interface unit 120A.

One skilled in the art will appreciate that the interface units 120A, B may not be directly coupled to the electronic devices 165, 175. In an embodiment, the interface devices 120 A, B may comprise one or more programmable infrared remote control units capable of controlling a plurality of electronic devices by changing of modulation, encoding, electromagnetic frequency or any combination thereof. Furthermore, a single interface unit may be associated with a particular plurality of electronic devices, the gaze upon the unit indicating that the particular plurality of electronic devices was selected from a larger plurality of available electronic devices. In some such embodiments, a particular electronic device of the particular plurality of electronic devices may be selected by the controller unit 100 based upon the content of an uttered verbal command. In this way a user may narrow the possible targets for a particular verbal command to a particular set of electronic devices based upon the direction of his or her gaze and may further narrow the possible targets for a particular verbal command based upon the content of the verbal command itself.

In situations where a user's gaze may fall upon more than one gaze sensor 45A while a aural command is uttered, the controller may be programmed to evaluate which of a plurality of gaze sensors 45 is providing the strongest detection signal in order to determine which electronic device 165, 175 is actually being visually selected. Alternately, discrimination logic could determine from the context of the uttered aural command 155 which electronic device 165, 175 is actually being selected.

In various embodiments, the gaze sensors 45A,B may be configured to detect a pair of eyes reflecting optical energy 110B having a characteristic encoding and/or modulation in order to determine which electronic device 165, 175 is being selected. The reflected optical energy 110B will be received, for example as a pair of dots, each of the dots having a size and spacing and orientation that is characteristic of having been reflected by a pair of retinas. The spacing and size of the dots may be incorporated into a user-specific arrangement where a particular user may be distinguished from other users based upon the size and spacing of the retinal reflection dots. More specifically, certain users may have a characteristic size/spacing ratio for reflection of their retinas as compared to reflections off the retinas of other users. This fact may be used by controller 100 to distinguish one user of the system from among a plurality of other users. Such a determination may be performed by the controller 100 so as only allow certain authorized users to control the electronic device 165, 175. The controller 100 may distinguish between users for other purposes as well, for example to determine if a particular gaze was issued by a particular user. Such a determination may be used in combination with voice identity techniques known in the relevant art so as to determine if a particular gaze and a particular vocal command were in fact issued by the same user. Such correlations may be used help prevent erroneous situations in which one user is gazing upon a device while another user is issuing a verbal command.

In addition, the duration in which the gaze sensors 45A, B are actively receiving optical signals 110A, 110B may be used to determine when and for how long a pair of eyes is looking at a particular electronic device 165, 175. The electronic devices 165, 175 may take a wide range of forms, including but not limited to televisions, radios, heating and air-conditioning units, electronically activated doors, lighting fixtures, ceiling fans, electronically activated faucets, automotive mirror adjusting devices, defrosting devices, seat adjusting devices, electronically adjustable furniture, electronically adjustable wall coverings, electronically adjustable floor coverings, and door locks.

Figure 2:
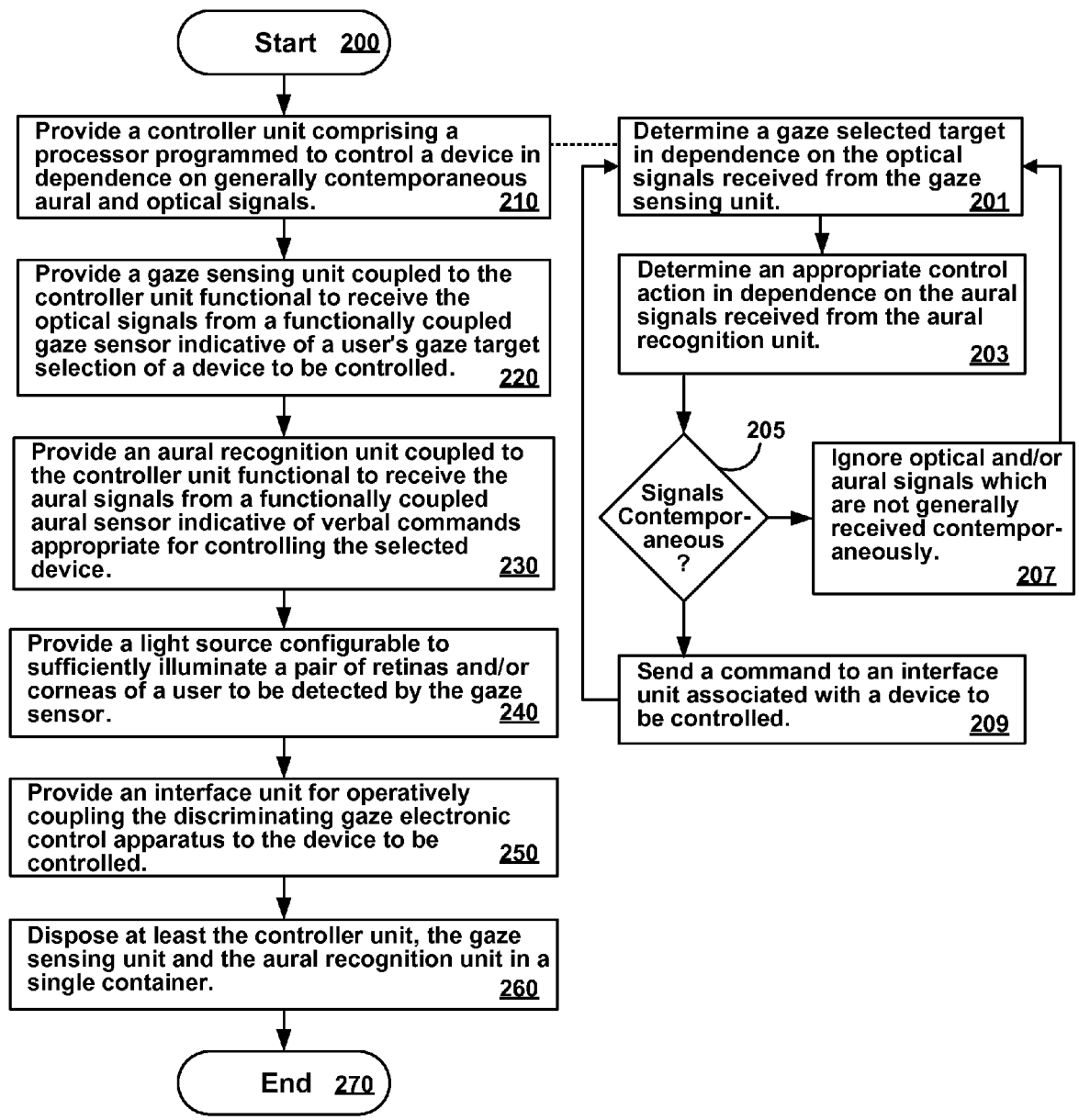
FIG. 2 depicts an exemplary flow chart of a process for providing a control device which utilizes visual gaze selec-

Referring to FIG. 2, a process for providing a gaze discriminating electronic controller is provided. In an embodiment, the process is initiated 200 by providing a controller unit. The controller unit comprises a processor programmed to control a device in dependence of receipt of generally contemporaneous aural and optical signals 210.

The processor is programmed to determine a gaze selected target in dependence on the optical signals received from the gaze detection unit 201. The processor is further programmed to determine an appropriate control action in dependence on the aural signals received from the aural recognition unit 203. If the optical and aural control signals are sufficiently contemporaneous 205, an appropriate command is sent to the interface unit associated with the device to be controlled 209. However, if the optical and aural control signals are not sufficiently contemporaneous 205, the controller discriminates against the optical and/or aural signals and does not send a control command to the electronic device to be controlled 207. The determination of sufficient contemporaneousness 205 may be performed at least in part based upon one or more gaze time-thresholds and/or gaze-synchronization parameters as described previously.

The optical signals are provided by a gaze sensing unit operatively coupled to the controller. The gaze sensing unit is functional to receive optical signals from a functionally coupled gaze sensor. The gaze sensor being configured to be indicative of a target electronic device a user is intending to select and control 220.

The aural signals are provided by an aural recognition unit 50 operatively coupled to the controller unit 100. The aural recognition unit 50 is functional to receive aural signals from a functionally coupled aural sensor indicative of verbal commands appropriate for controlling the visually selected device 230.

The gaze sensor 45 receives light energy radiated from a light source 85. The light source 85 provides sufficient illumination to cause a pair of retinas and/or corneas of a user to reflect light energy back to the gaze sensor which is indicative of a target device a user desires to control 240.

An interface unit is provided to operatively couple the target device to the controller. The interface device is coupled in one embodiment to a communications network. The communications network may be hardwired or wireless 250.

In an embodiment, the controller unit, gaze sensing unit and aural recognition unit are disposed in a common system container, for example an electronic device 260. Once the various units and sensors have been properly configured, the process ends 270.

The foregoing described exemplary embodiments are provided as illustrative descriptions only. They are not intended to limit the various inventive embodiments to any precise form described. In particular, it is contemplated that functional implementation of the embodiments described herein may be implemented equivalently in hardware, software, firmware, and/or other available functional components or building blocks. No specific limitation is intended to a particular arrangement or sequence. Other variations and embodiments are possible in light of above teachings, and it is not intended that this Detailed Description limit the scope of the inventive embodiments, but rather by the Claims following herein.

The invention claimed is:

1. A gaze-discriminating electronic control apparatus comprising:
    a controller unit comprising a processor programmed to control a selected device in dependence on generally contemporaneously received aural and optical signals;
    a gaze sensing unit operatively coupled to said controller unit and functional to receive said optical signals from a functionally coupled gaze sensor indicative of a user performing a device-targeting gaze upon said selected device;
    an aural recognition unit operatively coupled to said controller unit and functional to receive said aural signals from a functionally coupled aural sensor indicative of a user issuing a verbal command appropriate for controlling said selected device; and,
    a discriminator unit functional to determine if said aural signals and said optical signals are contemporaneous in dependence on at least one gaze determinative variable.

2. The apparatus according to claim 1 further including a proximity detection unit coupled to said controller unit functional to receive permissive activation signals from a functionally coupled proximity sensor disposed in a location to detect a user's presence.

3. The apparatus according to claim 1 wherein said controller unit further includes a light source configurable to sufficiently reflect off a pair of eyes of a user and be detected by said gaze sensor.

4. The apparatus according to claim 3 wherein said light source is an infrared light emitting diode.

5. The apparatus according to claim 1 wherein said gaze detection sensor is one of; a charge coupled device and a complimentary metal-oxide semiconductor.

6. The apparatus according to claim 1 wherein said aural sensor is a microphone.

7. The apparatus according to claim 1 wherein at least said controller unit, said gaze sensing unit and said aural recognition unit are installed in a container affixed to or in proximity to said selected device.

8. The apparatus according to claim 1 wherein said aural recognition unit is configured to recognize aural commands of a specific user.

9. The apparatus according to claim 1 wherein said controller unit includes a gaze timing circuit configured to determine whether said device-targeting gaze has been detected for a sufficient amount of time to allow selection.

10. The apparatus according to claim 1 wherein said controller unit includes a gaze timing circuit for determining whether said device-targeting gaze was detected prior to the inception of said issued verbal command by more than a certain time threshold.

11. A discriminating gaze electronic control system comprising:
    a controller unit comprising a processor programmed to control a selected device in dependence on generally contemporaneously received aural and optical signals;
    a gaze sensing unit operatively coupled to said controller unit and functional to receive said optical signals from a plurality of functionally coupled gaze sensors indicative of a user performing a device-targeting gaze upon one of a plurality of electronic devices;
    an aural recognition unit operatively coupled to said controller unit and functional to receive said aural signals from at least one functionally coupled aural sensor indicative of a user issuing a verbal command appropriate for controlling at least one of a plurality of electronic devices; and,
    a plurality of light sources configurable to sufficiently reflect off a pair of eyes of a user and be detected by at least one of said plurality of gaze sensors.

12. The system according to claim 11 wherein at least a portion of each of said plurality of gaze sensors is disposed in close proximity to one of a plurality of separate devices to be controlled.

13. The system according to claim 12 wherein each of said plurality of gaze sensors is disposed in close proximity to a different one of said plurality of separate devices to be controlled.

14. The system according to claim 11 wherein said gaze sensing unit is operative to determine a characteristic reflection off either a retinal portion or corneal portion of said user's eyes when said user is gazing in toward one or more of said plurality of gaze sensors.

15. The system according to claim 11 wherein each of said plurality of light sources emits a distinctive illumination signal assigned to a device to be controlled and distinguishable by said gaze sensing unit.

16. The system according to claim 11 wherein at least said plurality of gaze sensors are functionally coupled to said gaze sensing unit over a communications network.

17. The system according to claim 16 wherein said communications network is one of; a wired network, a wireless network and an electrical power network.

18. A method for providing a discriminating gaze electronic control apparatus comprising:
    providing a controller unit comprising a processor programmed to select and control a device in dependence on generally contemporaneously received aural and optical signals;
    providing a gaze sensing unit operatively coupled to said controller unit and functional to receive said optical signals from a functionally coupled gaze sensor indicative of a user performing a device-targeting gaze upon said selected device;
    providing an aural recognition unit operatively coupled to said controller unit and functional to receive said aural signals from a functionally coupled aural sensor indicative of a user issuing a verbal command appropriate for controlling said selected device; and,
    providing a discriminator circuit coupled to said processor and functional to determine if said aural signals and optical signals are contemporaneous based upon one or more gaze time-thresholds and/or gaze-synchronization parameters.

19. The method according to claim 18 further comprising providing a light source configurable to sufficiently reflect off a pair of eyes of a user to be detected as a characteristic signal by said gaze sensor only when said user is gazing substantially in a direction of a particular gaze sensor.

20. The method according to claim 18 further comprising disposing at least said controller unit, said gaze sensing unit and said aural recognition unit in a single container.

21. The method according to claim 20 wherein said container is configured to be one of, directly coupled to said device, disposed in close proximity to said device and remotely disposed.

22. The method according to claim 21 wherein said remotely disposed container is configured to be remotely operated by coupling at least said gaze sensor and said aural sensor to a communication network in processing communications with said controller unit.

23. The method according to claim 18 wherein said programmed comprises;
   determining a gaze selected target in dependence on said optical signals received from said gaze sensing unit;
   determining an appropriate control action in dependence on said aural signals received from said aural recognition unit; and
   discriminating against said optical signals or said aural signals which are not generally received contemporaneously.

24. A computer program product embodied in a tangible form executable by a processor associated with a discriminating gaze electronic control apparatus comprising instructions executable by said processor to:
   determine a gaze selected target in dependence on optical signals received from a gaze sensing unit;
   determine an appropriate control action in dependence on aural signals received from a aural recognition unit;
   discriminate against optical signals or aural signals which are not generally received contemporaneously; else,
   send a command to an interface unit associated with a device to be controlled.

25. The computer program product according to claim 24 wherein said appropriate control action is associated with a device to be controlled through an interface unit.

26. The computer program product according to claim 24 wherein said tangible form comprises magnetic media, optical media or logical media.

27. A system for selecting and controlling an electronic device from among a plurality of available electronic devices in dependence on a generally contemporaneous issuance of a verbal command and device-targeting gaze, said system comprising:
   a plurality of gaze sensors associated with and proximal to said plurality of available electronic devices and functional to detect whether a user's gaze falls proximal to at least one of said plurality of electronic devices in which at least one of said plurality of gaze sensors is associated therewith;
   an aural recognition unit functional to interpret a verbal command uttered by a user,
   a controller unit coupled to said plurality of gaze sensors and said aural recognition unit and functional to;
   evaluate whether said verbal command was uttered in general contemporaneousness with a device-targeting gaze;
   determine which of said plurality of available electronic devices said device-targeting gaze was proximal thereto; and,
   control a selected electronic device from said plurality of electronic devices in dependence on whether said uttered verbal command was in general contemporaneousness with said device-targeting gaze.

28. The system according to claim 27 wherein said controller evaluates said general contemporaneousness based at least in part on a gaze time-threshold.

29. The system according to claim 27 wherein said controller unit evaluates said general contemporaneousness based at least in part upon a gaze-synchronization parameter.

30. The system according to claim 27 wherein said controller unit determines whether said device-targeting gaze was proximal to said selected electronic device prior to the inception of said uttered verbal command by more than a certain time threshold.

31. The system according to claim 27 wherein said controller determines whether said device-targeting gaze lingered upon said selected electronic device following completion of said issued verbal command by more than a certain time threshold.

32. The system according to claim 27 further including a plurality of light emitters, each of said light emitters being associated with and proximal to at least one of said plurality of gaze sensors.

33. The system according to claim 32 wherein each of said gaze sensors is configured to detect light emitted by at least one of said light emitters and reflected off a pair of eyes of said user when said user provides said device-targeting gaze.

34. The system according to claim 33 wherein each of said gaze sensors is operative to detect a characteristic reflection off a retinal portion of said user's eyes only when said user gazes substantially in a direction of a particular gaze sensor.

35. The system according to claim 33 wherein each of said gaze sensors is operative to detect a characteristic reflection off a corneal portion of said user's eyes only when said user gazes substantially in the direction of a particular gaze sensor.

36. The system according to claim 35 wherein said characteristic reflection is such that a pair of corneal reflection is detected and each of said corneal reflections is determined to be substantially centered within a dark pupil region of one of said user's eyes.

* * * * *

UNITED STATES PATENT AND TRADEMARK OFFICE
CERTIFICATE OF CORRECTION

PATENT NO. : 7,438,414 B2  Page 1 of 1
APPLICATION NO. : 11/381504
DATED : October 21, 2008
INVENTOR(S) : Louis Rosenberg It is certified that error appears in the above-identified patent and that said Letters Patent is hereby corrected as shown below:

Column 3, line 19, after "comprises" insert --:--;
Column 3, line 51, delete "of," and insert --of:--;
Column 3, line 55, delete "comprises;" and insert --comprises:--.
Column 4, line 10, delete "of;" and insert --of:--;
Column 4, line 30, delete "to;" and insert --to:--.

Claim 5, column 17, line 45, delete "of;" and insert --of:--.
Claim 17, column 18, line 39, delete "of;" and insert --of:--.
Claim 21, column 19, line 5, delete "of," and insert --of:--.
Claim 23, column 19, line 14, delete "comprises;" and insert --comprises:--.
Claim 24, column 19, line 30, delete "a" and insert --an--.
Claim 27, column 20, line 2, delete "user," and insert --user;--;
Claim 27, column 20, line 4, delete "to;" and insert --to:--.

Signed and Sealed this

Twenty-third Day of December, 2008

JON W. DUDAS
*Director of the United States Patent and Trademark Office*